Sept. 6, 1932. E. RIDGILL 1,876,317
JIGGER CONVEYER
Filed Sept. 9, 1931 2 Sheets-Sheet 1
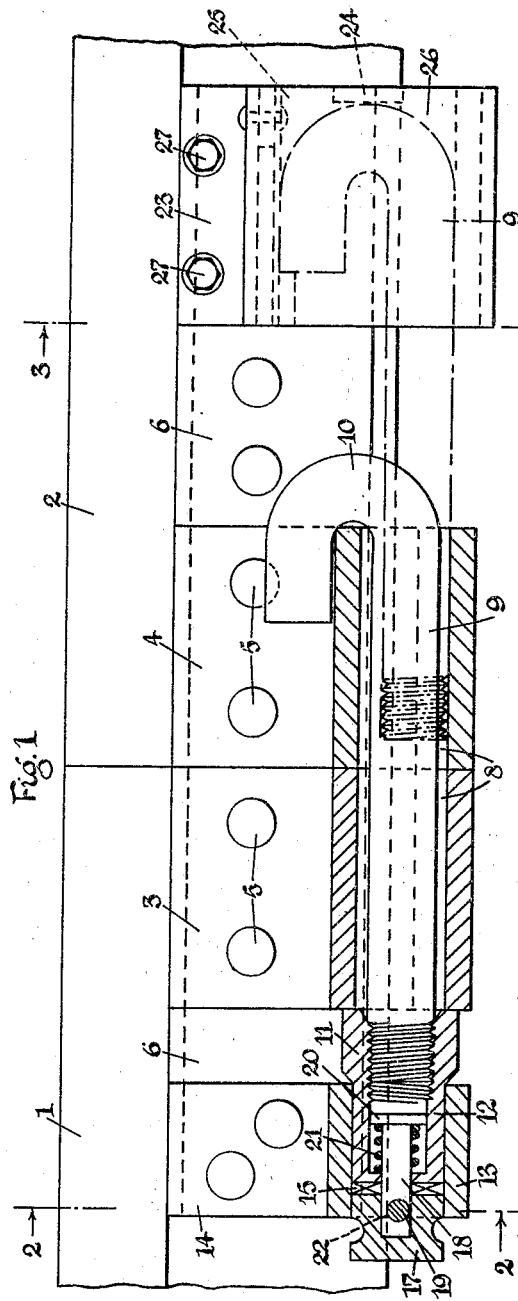
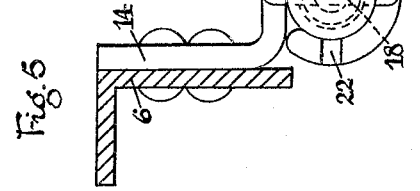
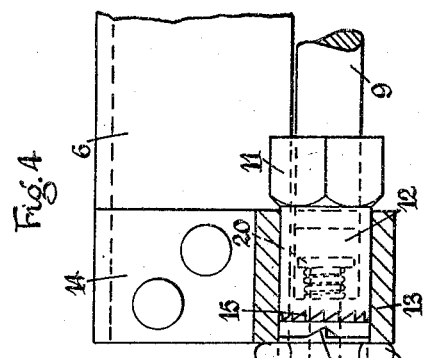
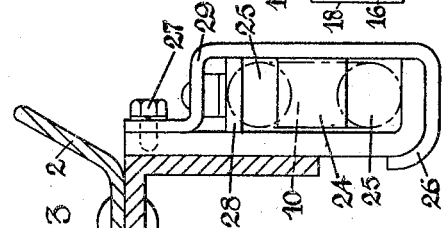
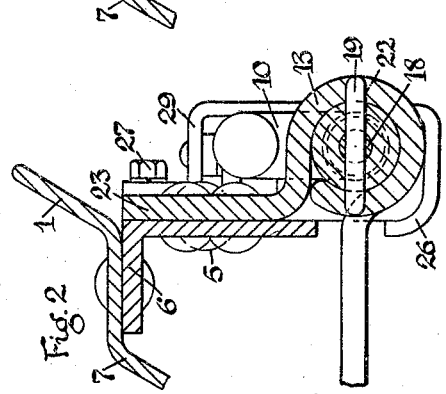
INVENTOR.
Ernest Ridgill
by Spear, Donaldson & Hoff
ATTY

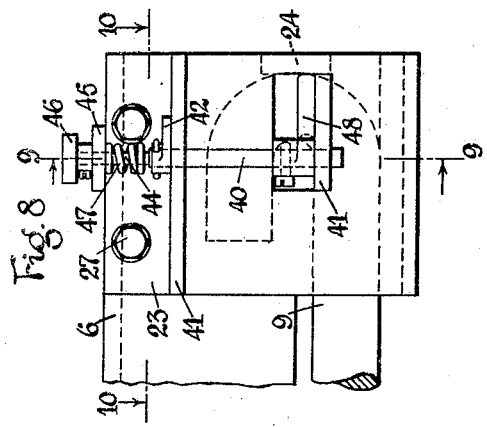

Patented Sept. 6, 1932

1,876,317

UNITED STATES PATENT OFFICE

ERNEST RIDGILL, OF DRONFIELD, SHEFFIELD, ENGLAND

JIGGER CONVEYER

Application filed September 9, 1931, Serial No. 561,934, and in Great Britain March 4, 1931.

This invention is for improvements in or relating to jigger conveyers and more particularly to conveyers of the type in which the trough is formed of aligned sections connected together.

Jigger conveyers of the described type have heretofore been constructed with the trough sections provided at their ends with lugs so that when sections are placed together for use, the lugs of adjacent sections contact with one another and a bolt is passed through holes formed in each pair of adjacent lugs for the purpose of securing the trough sections to one another. This construction has the disadvantage that the nuts of the bolts work loose and become detached and lost during the working operations of the conveyer.

The invention has for its object various improvements in the bolt type of connection for the troughs of jigger conveyers and consists broadly in the provision in a trough for a jigger conveyer of the kind referred to of a connection for the adjacent ends of two successive trough sections which comprises a bolt secured to one section and a nut permanently and rotatably mounted upon the other section in such a manner that when said adjacent ends of the said sections are disposed adjacent to and in alignment with one another, the said bolt and nut are automatically arranged in substantial parallelism with one another.

Further, according to this invention, there is provided connecting mechanism for the sections of troughs for jigger conveyers which comprises a nut assembly constructed so as to be rotatably mounted upon one section, a bolt assembly constructed so as to be slidably mounted upon a second section and means arranged to limit the axial movements of the bolt relatively to the second section for the purpose hereinafter specified.

Other features of the invention will be more particularly specified in the following description and in the appended claims.

In order that the invention may be fully understood, reference is directed to the accompanying drawings in which:—

Figure 1 is a longitudinal side elevation of the connecting means between the ends of a pair of trough sections constructed in accordance with this invention and with parts thereof illustrated in section, Figure 2 is a section on the line 2—2 of Figure 1, Figure 3 is a section on the line 3—3 of Figure 1, Figure 4 is a view of a detail of Figure 1 with parts illustrated in a different position, Figure 5 is a view at right angles to Figure 4, Figure 6 is a view similar to a portion of Figure 1 but illustrating a modification of the invention, Figure 7 is a section on the line 7—7 of Figure 6, Figure 8 illustrates a modified detail of the mechanism illustrated in Figure 1, Figure 9 is a section on the line 9—9 of Figure 8, Figure 10 is a section on the line 10—10 of Figure 8, and Figure 11 is a similar view to Figure 10, but illustrating the parts of the mechanism in a different position.

Referring to Figures 1 to 5, the ends of a pair of trough sections 1, 2 are provided upon each side (one side only being shown in Figure 1) with a corresponding pair of lugs 3, 4 secured by rivets 5 to brackets 6 (Figures 2 and 3), horizontal flanges of which are riveted to the underside of a horizontal portion 7 of the trough sections 1 and 2. The adjacent faces of each pair of lugs 3, 4 are arranged to abut against one another as illustrated in Figure 1, and the lugs are provided with aligned holes 8 through which a bolt 9 is arranged to extend. Each bolt 9 is provided with a hook shaped head 10 which limits the movement of the bolt to the left in Figure 1 by engagement with the lug 4. A nut 11 for the bolt 9 is provided with a hollow cylindrical extension 12 rotatably mounted in a socket 13 formed upon a lug 14 which is riveted to the bracket 6 to which the lug 3 is secured. The extension 12 of the nut 11 is provided with a series of ratchet teeth 15, Figure 4, upon its outer end which are arranged to co-operate with teeth 16 provided upon one face of a detent member 17 mounted within the socket 13. A guide rod 18 is coaxially mounted in the member 17 to which it is secured by means of a pin 19 arranged to extend diametrically through the said detent member and guide rod. The rod 18 extends axially into the interior of the hollow extension 12 and is provided with a head 20, a spring 21 being located between the said head and the inner face of the hollow extension 12. In the position of the parts illustrated in Figure 1, the pin 19 is located in notches 22, Figures 1 and 2, formed in one end face of the socket 13 and is maintained in this position by the spring 21.

Adjacent to the lug 4 on the trough section 2, an angle bracket 23, Figures 1 and 3, is secured to the corresponding bracket 6. A cover plate 26 is arranged over the bracket 23 so as to form an open ended box fitting therewith, and is secured to the said bracket by bolts 27. A lug 24 is provided on the cover plate 26 at the side thereof remote from the bolt 9 and is arranged to extend at right angles to the said plate into the path of movement of the bolt 9, spaces 25 being provided above and below the said lug for a purpose hereinafter described.

A spring controlled pawl 28 is mounted within the cover plate 26 upon an upper horizontally disposed portion 29 thereof and is arranged to co-operate with the hooked head 10 of the bolt 9 in a manner hereinafter described.

The connecting mechanism above described is employed as follows:—

When the trough sections 1 and 2 are unconnected, the bolt 9 is normally located in the position indicated in the dash and dot lines in Figure 1 so that the hooked head 10 thereof is located within the box fitting formed by the cover 26 and bracket 23 with the free end of the hook located behind the pawl 28. When it is desired to connect the two trough sections together the pawl 28 is lifted manually and the bolt 9 is removed from behind the cover 26 by an operator inserting his fingers through the spaces 25. The bolt 9 is then passed through the holes 8 in the lugs 3 and 4 until the screw threaded end thereof engages with the nut 11. The said nut is then rotated in a clockwise direction so as to screw the same on to the bolt 9 and thus securely fasten the trough sections 1 and 2 together. The rotation of the nut 11 is permitted by a yielding ratchet action being effected between the ratchet teeth 15 on the extension 12 and the teeth 16 of the detent member 17, the rotation of the latter being prevented by the engagement of the pin 19 in the notches 22.

When it is required to disconnect the trough sections, the detent member 17 is withdrawn from the socket 13 against the influence of the spring 21 until the pin 19 is removed from the notches 22, and the member 17 is then rotated through an angle which moves the pin 19 clear of the notches 22, for example, into the position indicated in Figures 4 and 5 in which the pin 19 bears against the end face of the socket 13. This movement of the member 17 disengages the teeth 16 thereon from the ratchet teeth 15 of the nut 11 so that the said nut is free to be moved in an anti-clockwise direction and unscrewed from the bolt 9.

When the nut 11 has been removed from the bolt 9, the said bolt is moved to the right in Figure 1, until the hooked head 10 thereof is moved behind the cover 26, the pawl 28 being deflected by the head of the bolt and finally snapping in front of the free end of the hook into the position indicated in Figure 1 so as to maintain the bolt 9 securely in the position indicated in dot and dash lines in the said figure. In this position the thread of the bolt 9 is located within the hole 8 in the lug 4 and is thus effectually protected against damage. It will be observed that with the construction of connecting means for the troughs of jigger conveyers as above described, both the bolt 9 and nut 11 are permanently attached to the trough sections 1 and 2 so that they cannot become mislaid and the provision of the ratchet mechanism described effectually prevents the nuts 11 from working loose during the use of the conveyer.

Referring to Figures 6 and 7, a modified form of nut 11 and ratchet mechanism therefor is illustrated in which the nut 11 is secured to the trough section 1, by means of a screw 30 arranged to extend through a flanged washer 31 and screwing into the cylindrical extension 12 of the said nut. The nut 11 is provided with a series of circumferentially arranged ratchet teeth 32 with which a pivotally mounted pawl 33 is arranged to co-act. The pawl 33 is pivotally mounted at 34 to the lug 14 and is controlled by a spring 35 mounted upon the corresponding bracket 6. The spring 35 is provided with a flat portion 36 which normally bears against a point 37 of the pawl 33 to permit the yielding movements of the pawl 33 to be effected which are necessary to permit the nut 11 to be screwed on to the bolt 9. When it is required to unscrew the nut 11, the pawl 33 is lifted into the position indicated in dot and dash lines in Figure 7 where it is maintained by the engagement of the portion 36 of the spring 35 with a flat portion 38 provided on the said pawl.

Figures 8 to 11 illustrate a modified construction of the mechanism for retaining the hooked head 10 of the bolt 9 in position behind the cover 26. In this modified mechanism a forked member 39 is secured to a vertically disposed spindle 40 pivotally mounted in an extension 41 of the cover 26. A detent member 42 is keyed to the upper end of the spindle 40 and is arranged to co-operate with a spring blade 43 secured to the lower end of a rod 44 which is rotatably mounted in a guide hole formed in a bracket extension 45 provided upon the cover 26. The rod 44 is provided with a knob 46 which is displaceable vertically against the influence of a spring 47.

When the bolt 9 is in use for securing the corresponding trough section to another, the forked member 39 is located in the position shown in Figure 11, and when the said bolt is detached from the nut therefor and is moved into position behind the cover 26, the hooked head 10 of the said bolt engages with one arm 48 of the forked member 39 which extends into the path of movement thereof, as illustrated in Figure 11. A further movement of the bolt 9 of the right in Figure 11 causes the forked member 39 to be rotated about its pivot until the other arm 49 thereof extends within the hook 10 as indicated in Figures 8 to 10; during this movement, the spring 43 is flexed by the detent member 42 until it finally snaps in front of the said member into the position illustrated in Figure 10, thus securely maintaining the bolt behind the cover 26.

When it is required to remove the bolt from behind the cover 26, the rod 44 is moved upwardly by means of the knob 46 until the spring 43 is raised out of the path of movement of the detent member 42 so that the forked member 39 is free to be rotated about its pivot as the bolt is removed from behind the cover 26.

It is to be understood that the invention may be equally well applied to arrangements in which the bolts 9 are provided with other forms of heads than the hooked head 10 illustrated in the drawings.

What I claim is—

1. Connecting mechanism for the sections of troughs for jigger conveyers which comprises a nut assembly constructed so as to be rotatably mounted upon one section, a bolt assembly constructed so as to be slidably mounted upon a second section and means arranged to limit the axial movements of the bolt relatively to the second section for the purpose specified.

2. Connecting mechanism as claimed in claim 1, wherein the nut assembly comprises a nut provided with a cylindrical extension rotatably mounted and secured within a socket member arranged to be secured to a trough section.

3. In a trough for a jigger conveyer of the kind referred to, a connection for the adjacent ends of two successive trough sections which comprises a bolt secured to one section and a nut permanently and rotatably mounted upon the other section in such a manner that when the said adjacent ends of the said sections are disposed adjacent to and in alignment with one another, the said bolt and nut are automatically arranged in substantial parallelism with one another, for the purpose described.

4. In a trough for a jigger conveyer of the kind referred to, a connection for the adjacent ends of two successive trough sections which comprises in combination a bolt secured to one section, a nut permanently and rotatably mounted upon the other section and a ratchet mechanism operable normally to prevent rotation of the nut in a direction which would loosen the same from the bolt when screwed thereon, the said bolt and nut being so arranged upon their respective sections that when the corresponding ends of the sections are disposed adjacent to and in alignment with one another, the said bolt and nut are automatically arranged in substantial parallelism with one another, for the purpose described.

5. In a trough for a jigger conveyer of the kind referred to, a connection for the adjacent ends of two successive trough sections which comprises in combination a bolt secured to one section, a nut having a cylindrical extension rotatably mounted in a socket provided upon the other section, means operable to secure said extension permanently in said socket, detent mechanism normally operable to prevent rotation of the nut in a direction which would loosen the same from the bolt when screwed thereon and means operable to disengage said detent mechanism, the said bolt and nut being so arranged upon their respective sections that when the corresponding ends of the sections are disposed adjacent to and in alignment with one another, the said bolt and nut are automatically arranged in substantial parallelism with one another, for the purpose described.

6. In a trough for a jigger conveyer of the kind referred to, a connection for the adjacent ends of two successive trough sections which comprises in combination a bolt slidable axially in a socket provided upon one section, means adapted to limit the sliding movements of the bolt in both forward and rearward directions and in the rearward direction so that the thread of the bolt is located within said socket and a nut permanently and rotatably mounted upon the other section in such a manner that when the said adjacent ends of the said sections are disposed adjacent to and in alignment with one another, the said bolt and nut are automatically arranged in substantial parallelism with one another, for the purpose described.

7. In a trough for a jigger conveyer of the kind referred to, a connection for the adjacent ends of two successive trough sections which comprises in combination a bolt slidable axially in a socket provided upon one section, means adapted to limit the sliding movements of the bolt in both forward and rearward directions and in the rearward direction so that the thread of the bolt is located within said socket, a nut permanently and rotatably mounted upon the other section and a ratchet mechanism operable normally to prevent rotation of the nut in a direction which would loosen the same from the bolt when screwed thereon, the said bolt and nut being so arranged upon their respective sections that when the corresponding ends of the sections are disposed adjacent to and in alignment with one another, the said bolt and nut are automatically arranged in substantial parallelism with one another, for the purpose described.

8. In a trough for a jigger conveyer of the kind referred to, a connection for the adjacent ends of two successive trough sections which comprises in combination a bolt slidable axially in a socket provided upon one section, means adapted to limit the sliding movements of the bolt in both forward and rearward directions and in the rearward direction so that the thread of the bolt is located within said socket, a nut having a cylindrical extension rotatably mounted in a socket provided upon the other section, means operable to secure said extension permanently in said socket, detent mechanism normally operable to prevent rotation of the nut in a direction which would loosen the same from the bolt when screwed thereon and means operable to disengage said detent mechanism, the said bolt and nut being so arranged upon their respective sections that when the corresponding ends of the sections are disposed adjacent to and in alignment with one another, the said bolt and nut are automatically arranged in substantial parallelism with one another, for the purpose described.

9. In a trough for a jigger conveyer of the kind referred to, a connection for the adjacent ends of two successive trough sections which comprises in combination a bolt slidable axially in a socket provided upon one section, means adapted to limit the sliding movements of the bolt in both forward and rearward directions and in the rearward direction so that the thread of the bolt is located within said socket, means operable automatically to retain said bolt in the rearward position, and a nut permanently and rotatably mounted upon the other section in such a manner that when the said adjacent ends of the said sections are disposed adjacent to and in alignment with one another, the said bolt and nut are automatically arranged in substantial parallelism with one another, for the purpose described.

10. In a trough for a jigger conveyer of the kind referred to, a connection for the adjacent ends of two successive trough sections which comprises in combination a hook-headed bolt slidable axially in a socket provided upon one section, means adapted to limit the sliding movements of the bolt in both forward and rearward directions and in the rearward direction so that the thread of the bolt is located within said socket, detent means operable automatically to engage the head of said bolt as the same is moved to the rearward position and to retain the bolt in said position until manually released, a nut permanently and rotatably mounted upon the other section and a ratchet mechanism operable normally to prevent rotation of the nut in a direction which would loosen the same from the bolt when screwed thereon, the said bolt and nut being so arranged upon their respective sections that when the corresponding ends of the sections are disposed adjacent to and in alignment with one another, the said bolt and nut are automatically arranged in substantial parallelism with one another, for the purpose described.

11. In a trough for a jigger conveyer of the kind referred to, a connection for the adjacent ends of two successive trough sections which comprises in combination a hook-headed bolt slidable axially in a socket provided upon one section, means adapted to limit the sliding movements of the bolt in both forward and rearward directions and in the rearward direction so that the thread of the bolt is located within said socket, detent means operable automatically to engage within the hook of the head of said bolt as the same is moved to the rearward position and to retain the bolt in said position until manually released, a nut permanently and rotatably mounted upon the other section and a ratchet mechanism operable normally to prevent rotation of the nut in a direction which would loosen the same from the bolt when screwed thereon, the said bolt and nut being so arranged upon their respective sections that when the corresponding ends of the sections are disposed adjacent to and in alignment with one another, the said bolt and nut are automatically arranged in substantial parallelism with one another, for the purpose described.

12. Connecting mechanism for the section of troughs of jigger conveyers which comprises a nut assembly consisting of a nut provided with a cylindrical extension rotatably mounted and secured within a socket arranged to be secured to a trough section, ratchet teeth on said extension, a yieldingly controlled detent member operatively engaging said teeth to prevent rotation of said nut in one direction for the purpose described and a bolt assembly constructed so that the bolt can be slidably mounted upon a second trough section and including means adapted to limit the axial movements of the bolt relatively to the said second section.

13. Connecting mechanism for the section of troughs of jigger conveyers which comprises a nut assembly consisting of a nut provided with a cylindrical extension rotatably mounted and secured within a socket arranged to be secured to a trough section, ratchet teeth on said nut, a yieldingly controlled detent operatively engaging said teeth to prevent rotation of said nut in one direction for the purpose described and a bolt assembly constructed so that the bolt can be slidably mounted upon a second trough section and including means adapted to limit the axial movements of the bolt relatively to the said second section.

14. Connecting mechanism for the section of troughs of jigger conveyers which comprises a nut assembly consisting of a nut provided with a cylindrical extension rotatably mounted and secured within a socket arranged to be secured to a trough section, ratchet teeth on said extension, a yieldingly controlled detent member operatively engaging said teeth to prevent rotation of said nut in one direction for the purpose described and a bolt assembly adapted to be mounted upon a second trough section and which consists of a bolt slidably mounted in an axial direction in a hollow lug secured to a bracket and a fitting arranged to receive the head of the bolt when the same is displaced in the hollow lug in the direction towards the head and means operable to lock the head within the fitting for the purpose specified.

15. Connecting mechanism for the section of troughs of jigger conveyers which comprises a nut assembly consisting of a nut provided with a cylindrical extension rotatably mounted and secured within a socket arranged to be secured to a trough section, ratchet teeth on said nut, a yieldingly controlled detent operatively engaging said teeth to prevent rotation of said nut in one direction for the purpose described and a bolt assembly adapted to be mounted upon a second trough section and which consists of a bolt slidably mounted in an axial direction in a hollow lug secured to a bracket and a fitting arranged to receive the head of the bolt when the same is displaced in the hollow lug in the direction towards the head and means operable automatically to lock the head with the fitting for the purpose specified.

ERNEST RIDGILL.